UNITED STATES PATENT OFFICE.

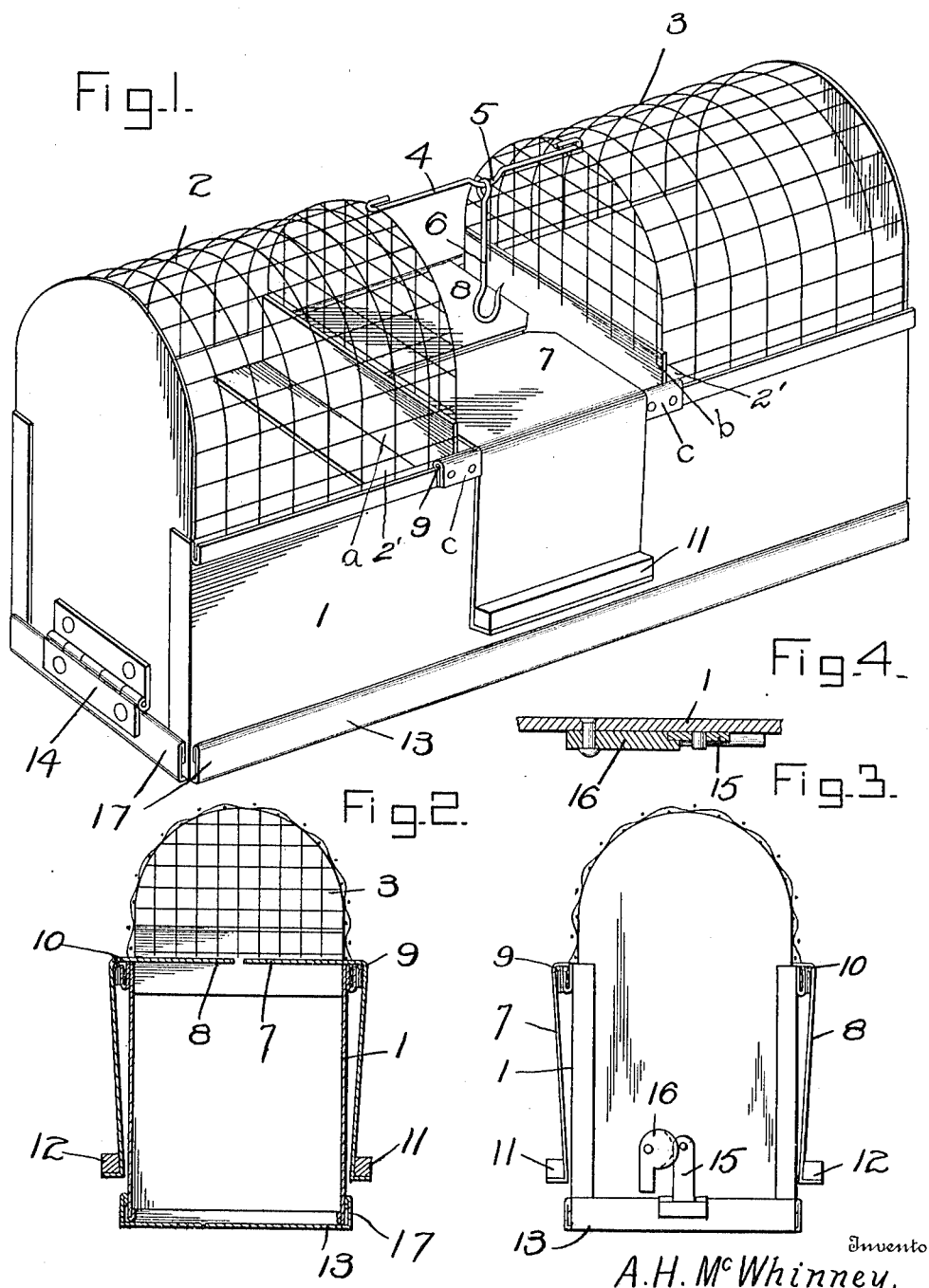

ALFRED H. McWHINNEY, OF MACOMB, ILLINOIS.

TRAP.

1,064,082.  Specification of Letters Patent.  Patented June 10, 1913.

Application filed February 18, 1908.  Serial No. 416,453.

*To all whom it may concern:*

Be it known that I, ALFRED H. McWHIN-NEY, a citizen of the United States, residing at Macomb, in the county of McDonough and State of Illinois, have invented a new and useful Trap; and I do hereby declare the following to be a full, clear, and exact description of the invention such as will enable others skilled in the art to which it appertains to make and use the same.

The invention relates to animal traps, and has for its object to provide a simple, inexpensive and durable device of this character adapted to entrap small animals or mice.
In the drawings, Figure 1 is a perspective view of a trap constructed in accordance with this invention. Fig. 2 is a transverse sectional view taken through the pivoted members. Fig. 3 is an end view. Fig. 4, is a detailed horizontal sectional view produced through the trap and its bottom retaining contrivance.

Referring to the drawings, 1 designates the body of my trap having two sections 2 and 3, composed of wire netting, and having a wire 4, provided with a loop 5, connecting said sections, these wire netting sections have their inner ends supported by L-shaped members 2' which are so arranged that one part lies horizontal, the members thus forming supports for the wire and also rests for trapped animals so that they may be seen from the outside of said trap. From the loop 5, is suspended a carrying hook 6. Beneath the hook 6, are arranged two pivoted L-shaped members 7 and 8 which are mounted on pivot rods 9 and 10. The lower ends of the members 7 and 8, are provided with weights 11 and 12, so that when a mouse is attracted by the bait he steps on the upper portion of one or both of the sides 7 and 8, which yield and permit him to fall into the trap. The members 7 and 8 are then restored to their normal position by means of the weights 11 and 12, as will be readily understood. The device is provided with a bottom 13, having a hinge 14 at one end and a latch 15 at the other end which is made secure by an eccentric or lever 16. When it is desired to destroy the rats, the trap is submerged in water, thus drowning the rats or mice, and the bottom can then be unfastened for conveniently dropping the contents out. The bottom is provided with overlapping walls 17 which render the inmates secure and prevent the possibility of their escape.

The rods 9 and 10 are provided with looped plates $c$ rigidly connected to said rods and arranged one on each side of said platforms for holding the same against longitudinal movement. The inner ends of the sections 2 and 3 are each provided with L-shaped plates $a$ and $b$ which guide the tiltable platforms in their movements.

What is claimed is,

In a trap of the kind described, the casing composed of a bottom, side walls and end walls, said end walls projecting upward above the top of casing, mesh work arches secured to said side and end walls and provided with spaced inner mesh work ends, L-shaped supports arranged to hold the lower edges of the mesh work arch ends, said supports furthermore serving to permit trapped animals to rest thereon whereby they may be seen from the outside of the trap, bait holding means suspended centrally between said mesh work ends, and downwardly opening trap doors closing the space of the top of the casing between said supports.

In testimony whereof I have signed my name to this specification in the presence of two subscribing witnesses.

ALFRED H. McWHINNEY.

Witnesses:
  GEO. H. SCOTT,
  JOHN C. McKEE.

---

Copies of this patent may be obtained for five cents each, by addressing the "Commissioner of Patents, Washington, D. C."